Oct. 25, 1932.    A. KUTYNIAK    1,883,975

COMBINED HEIGHT-GAUGE MICROMETER

Filed March 3, 1930

INVENTOR.
Anton Kutyniak
BY
ATTORNEYS.

Patented Oct. 25, 1932

1,883,975

UNITED STATES PATENT OFFICE

ANTON KUTYNIAK, OF PLAINFIELD, NEW JERSEY

COMBINED HEIGHT-GAUGE MICROMETER

Application filed March 3, 1930. Serial No. 432,701.

This invention relates to improvements in precision measuring instruments, particularly to a combined height gauge and micrometer, allowing the accurate measuring of the length, dimensions of objects, and of angles, and it is the principal object of my invention to provide a compact, simple and inexpensive combination instrument of this character which is accurate and readily operated.

Another object of my invention is the provision of a combined height gauge and micrometer allowing a locking of the measuring elements in their adjusted position thus preserving exact readings while means are provided to hold the sliding arms to their post and to prevent scratching and marring of the latter.

These and other objects and advantages of my invention will become more fully known as the description thereof proceeds and will then be specifically defined in the appended claim.

In the accompanying drawing, forming a material part of this disclosure:

Figure 1:
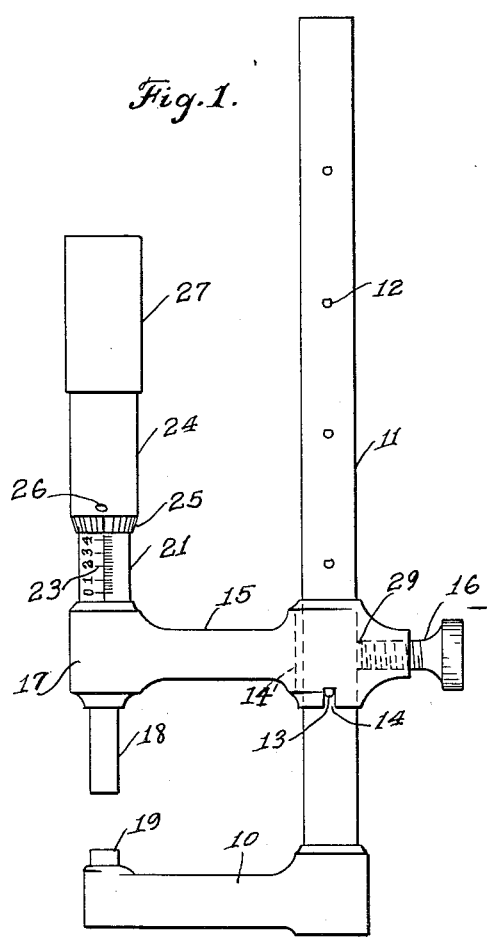
Fig. 1 is a front elevation of a micrometer constructed according to my invention.
Figure 2:
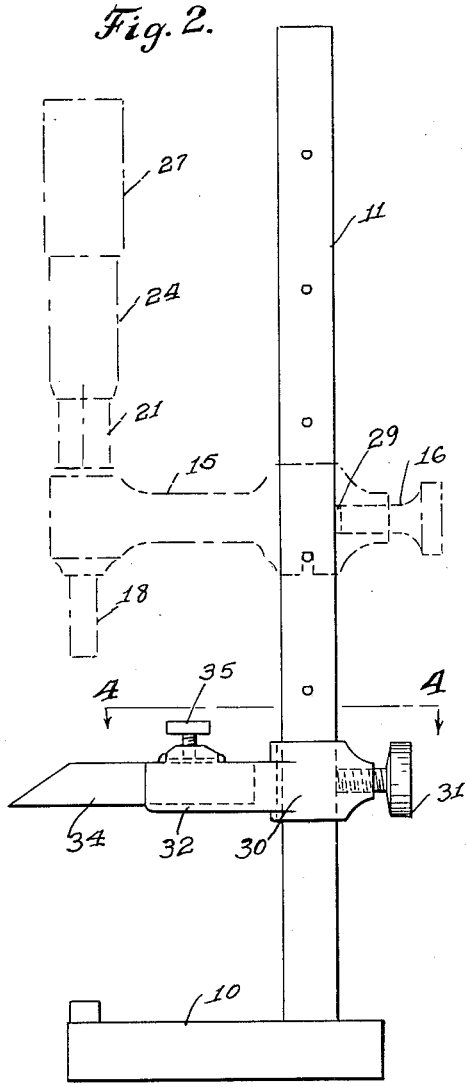
Fig. 2 is a view similar to Figure 1 showing the combination of the micrometer, with the height gauge.
Figure 3:
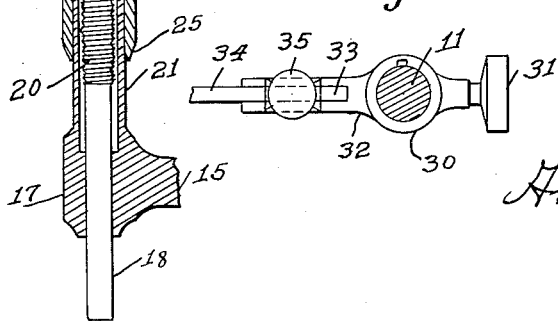
Fig. 3 is a fragmentary longitudinal sectional elevation of the micrometer shank and thimble.
Figure 4:
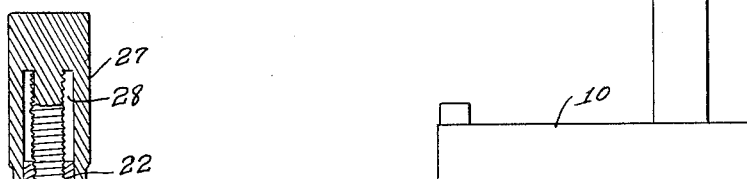
Fig. 4 is a section on line 4—4 of Figure 2.

As illustrated, the gauge constructed comprises a base 10 carrying at one end a post or upright 11 provided with a plurality of perforations 12 for the reception of stop pins 13 adapted to engage in a recess 14 of the socket of a sliding arm 15 held in its adjusted position on the post by means of a set screw 16.

The other end of arm 15 carries a socket 17 allowing the passage of a rotatable and sliding spindle 18 co-operating with an anvil 19 on base 15. The spindle 18 is threaded at its upper end as at 20 and is guided through a tube or sleeve 21 formed with an inner upper threaded part 22 and carrying on its outer face graduations 23 forming decimal equivalents so that for instance by turning the thimble 24 1/25 of a revolution, the distance between the anvil and the end of the spindle is increased or diminished 1/25 of 25/1000 of an inch, or other suitable graduations may be provided for different purposes.

Pin 18 and thimble 24 are integral, and thimble 24 has a bevelled lower end 25 carrying suitable gauge members 26, as for instance 0 to 20, and the outer upper end of movable or sliding thimble 24 is suitably milled as at 27, while an inner space 28 allows the part 22 to enter sleeve 24.

A washer plate 29 or other suitable element is interposed between the inner end of set screw 16 and post 11 in order to prevent scratching of the highly polished outer surface thereof.

In combination with the micrometer a height gauge may be used, having a socket 30 slidably guided along post 11 and adapted to be locked in its adjusted position by means of a set screw 31 and a plate similar to plate 29 may be interposed between the inner end of set screw 31 and post 11 in order to prevent scratching of the highly polished face. An arm 32 is laterally extending from socket 30 and formed integrally therewith, and has a groove 33 formed therewith in which slides a measuring bar 34 adapted to be locked in its adjusted position by means of a set screw 35. The socket of sliding arm 15 is provided with an inner groove 14' spaced 90° around the post 11 from 14, allowing a moving up and down of arm 15 on post 11 over pins 13.

The operation of my device will be entirely clear from the above description thereof and by simultaneous inspection of the drawing, and it will be clear that with the micrometer the length or width of an object may be accurately measured.

It will be understood that I have described and illustrated the preferred form of my device only, and that I may make such changes therein as come within the scope of the appended claim without departure from my invention.

Having thus described my invention, what I claim as new and desire to secure by Letters Patent is:

In a height-gauge of the character described, a base, an upright post carried by said base, pins projecting at intervals from said post, a socket adapted for reciprocatory motion along said post and having a recess formed in its lower edge adapted to selectively engage any of said pins during its reciprocation along said post, said socket having an inner groove spaced 90° around the socket from said recess to permit the sliding of said socket over said pins upon rotation of said socket for an angle of 90° about said post, an arm formed with said socket, a graduated sleeve formed with said arm, a spindle passing through this sleeve, a thimble integral with said spindle and having a beveled and graduated end and a milled head, the graduations on said thimble being at an angle of 90° to the graduations of said sleeve, and a set screw to lock the first named socket in any of its adjusted positions relative to said post.

Signed at Plainfield, in the county of Union, and State of New Jersey, this 13th day of February, A. D. 1930.

ANTON KUTYNIAK.